C. A. SAHLBERG.
STEAM STUMP CUTTER AND SOIL PREPARER.
APPLICATION FILED MAR. 18, 1918.

1,278,758.

Patented Sept. 10, 1918.

Inventor:
Carl August Sahlberg

Witnesses:
Effie Bagley

UNITED STATES PATENT OFFICE.

CARL AUGUST SAHLBERG, OF CHICAGO, ILLINOIS.

STEAM STUMP-CUTTER AND SOIL-PREPARER.

1,278,758. Specification of Letters Patent. Patented Sept. 10, 1918.

Application filed March 18, 1918. Serial No. 223,195.

*To all whom it may concern:*

Be it known that I, CARL AUGUST SAHLBERG, a citizen of the United States, residing at Chicago, in the county of Cook and State of Illinois, have invented a new and useful Steam Stump-Cutter and Soil-Preparer.

This invention relates to certain improvements in agricultural machines and it is an object of the invention to provide a device of this general character having novel and improved means whereby soil may be treated in order to place the same in condition for cultivation.

It is also an object of the invention to provide a novel and improved device of this general character including a portable body having arranged at one side thereof a ground working element together with means whereby said element may be readily and conveniently thrown out of or into working position.

Another object of the invention is to provide a device of this general character having novel and improved means whereby the same may be employed effectively to free the soil of roots, stumps or the like as the occasions of practice may require.

The invention consists in the details of construction and in the combination and arrangement of the several parts of my improved steam stump cutter and soil preparer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein.

Figure 1:
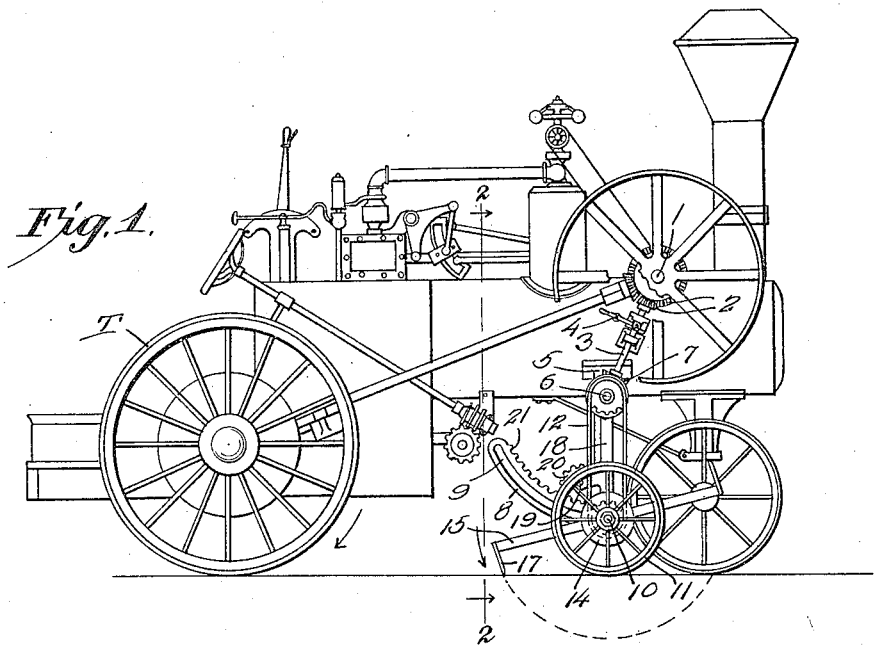
Figure 1 is a view in side elevation illustrating an agricultural machine constructed in accordance with an embodiment of my invention.
Figure 2:
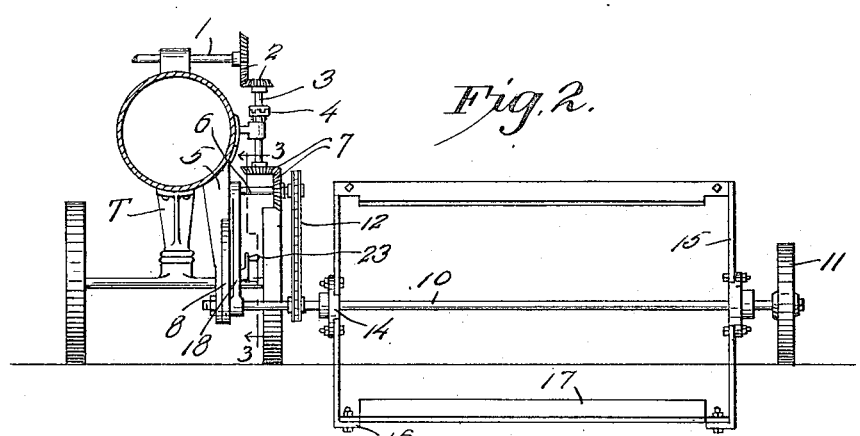
Fig. 2 is a sectional view taken substantially on the line 2—2 of Fig. 1.
Figure 3:
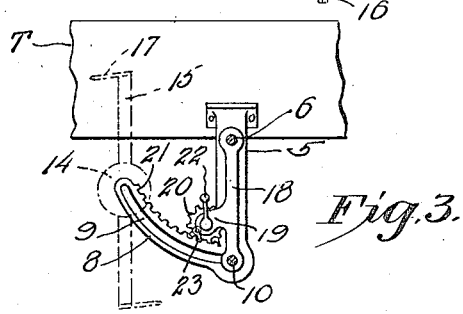
Fig. 3 is a fragmentary sectional view taken substantially on the line 3—3 of Fig. 2.

As disclosed in the accompanying drawings T denotes a tractor of a steam type and preferably of the character which can readily employ wood as a fuel, although I do not wish to be understood as limiting myself to any particular type of tractor. Embodied in the tractor structure and preferably adjacent the forward end thereof is a driving shaft 1 operatively connected as at 2 with the substantially vertically disposed shaft 3. It is desired that the shaft 3 comprise two sections under control of the clutch mechanism 4 so that when desired the lower portion of the shaft may be rendered inoperative.

The forward portion of the tractor is provided with the depending hanger 5 and rotatably engaged with the upper portion of said hanger 5 is a shaft 6 operatively engaged as at 7 with the lower end portion of the lower section of the shaft 3.

The lower end portion of the hanger 6 is provided with the rearwardly disposed extension 8 provided with an arcuate slot 9 concentric to the shaft 6. Extending within the slot 9 is an end portion of the shaft 10 extending laterally from the tractor T and the outer end portion of the shaft 10 has mounted thereon the ground engaging wheel 11 which serves as a support for the outer end portion of the shaft 10. The shafts 6 and 10 are operatively connected through the medium of the chain 12 or its equivalent.

Secured to the shaft at desired points thereon are the hubs or sleeves 14 and from each of which radiate the oppositely directed arms 15 preferably two in number. The arms 15 carried by one hub or sleeve 14 are arranged in parallelism with the arms 15 of the second hub or sleeve whereby said arms 15 are arranged in pairs alined longitudinally of the shaft 10.

The arms of each longitudinally alined pair are provided with the inwardly directed lugs or extensions 16 to which is detachably engaged a working element 17. As herein disclosed the elements 17 are of a blade type and are adapted to be used in connection with roots, stumps or the like which may be in the soil being treated.

The inner end portion of the shaft 10 is also disposed through the lower end portion of a rigid arm 18 and the upper end portion of the arm 18 is loosely engaged with the shaft 6. The arm 18 above the extension 9 but in close proximity thereto is provided with a rearwardly directed extension or bracket 19 which rotatably supports the gear wheel 20 in mesh with the arcuate rack 21 formed on the upper edge of the extension 9 and concentric to the shaft 6. Operatively engaged with the gear 20 is an operating member or crank 22 which affords means whereby the gear 20 may be rotated in a direction to swing the rigid arm 18 upwardly so that the shaft 10 may be raised to a position to render the working element 17 inoperative. In order to maintain the arm 18 elevated the holding dog 23 is pivotally engaged with the extension or bracket 19 and engages by gravity the rack 21 whereby the arm 18 is held against downward movement after the same has been swung upwardly. When it is desired to lower the arm 18 to position the shaft 10 in working position it is only necessary to disengage the dog 23 from the rack 21.

The arms 15 are of such a length as to cause the working element 17 carried thereby to travel a desired distance below the surface of the soil so that as the elements 17 pass through the soil said elements will cut the roots and stumps within the earth, split them up in small pieces, and throw said pieces rearwardly. When the machine reaches a relatively large stump the elements 17 will be caused to operate thereon or carve the same until it has been removed.

While I have herein disclosed the elements 17 of a type particularly adapted for chopping action upon roots, stumps, or the like, it is to be understood that the same may be replaced if desired with suitable elements to permit the machine to be employed for the removing of sod. However, as this is believed to be an obvious expedient, a detailed description and illustration thereof is deemed unnecessary.

From the foregoing description it is thought to be obvious that a steam stump cutter and soil preparer constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim,

1. An agricultural machine comprising a portable body including a driving shaft, an arm carried by the body and mounted for swinging movement, a shaft supported by the outer end portion of the arm and extending laterally of the body, a ground working element carried by the shaft, an operative connection between the driving shaft and the second named shaft, means for swinging the arm upwardly to elevate the shaft carried thereby, and a ground engaging wheel carried by the outer end portion of the shaft carried by the swinging arm.

2. A machine of the character described comprising a portable body including a driving shaft, a hanger depending therefrom and provided at its lower end with a rearwardly directed extension, said extension having an arcuate slot, an arm depending from the body and mounted for swinging movement, the slot in the extension of the hanger being concentric to the pivot of the arm, a shaft engaged with the arm and extending within the slot of the extension of the hanger, said shaft being disposed laterally from the body, a ground engaging element carried by the shaft, an operative connection between the driving shaft and the second named shaft, and coacting means carried by the swinging arm and the extension of the hanger for swinging upwardly the arm and shaft coacting therewith.

3. A machine of the character described comprising a portable body including a driving shaft, a hanger depending therefrom and provided at its lower end with a rearwardly directed extension, said extension having an arcuate slot, an arm depending from the body and mounted for swinging movement, the slot in the extension of the hanger being concentric to the pivot of the arm, a shaft engaged with the arm and extending within the slot of the extension of the hanger, said shaft being disposed laterally from the body, a ground engaging element carried by the shaft, an operative connection between the driving shaft and the second named shaft, the extension of the hanger being provided with an arcuate rack concentric to the pivot of the swinging arm, and a gear wheel carried by the arm meshing with the arcuate rack, said gear being provided with operating means.

4. A machine of the character described comprising a portable body including a driving shaft, a hanger depending therefrom and provided at its lower end with a rearwardly directed extension, said extension having an arcuate slot, an arm depending from the body and mounted for swinging movement, the slot in the extension of the hanger being concentric to the pivot of the arm, a shaft engaged with the arm and extending within the slot of the extension of the hanger, said shaft being disposed laterally from the body, a ground engaging element carried by the shaft, an operative connection between the driving shaft and the second named shaft, the extension of the hanger being provided with an arcuate rack concentric to the pivot of the swinging arm, a gear wheel carried by the arm meshing with the arcuate rack, said gear being provided with operating means, and a dog carried by the arm and engaging the rack for holding the arm against downward movement after being swung upwardly.

CARL AUGUST SAHLBERG.

Copies of this patent may be obtained for five cents each, by addressing the "Commissioner of Patents, Washington, D. C."